March 12, 1935.    R. M. HARDGROVE    1,994,446
FUEL BURNER
Original Filed Jan. 14, 1928    3 Sheets-Sheet 1

INVENTOR
Ralph M. Hardgrove
BY
Gifford, Scull & Burgess
ATTORNEY

March 12, 1935.  R. M. HARDGROVE  1,994,446
FUEL BURNER
Original Filed Jan. 14, 1928  3 Sheets-Sheet 3
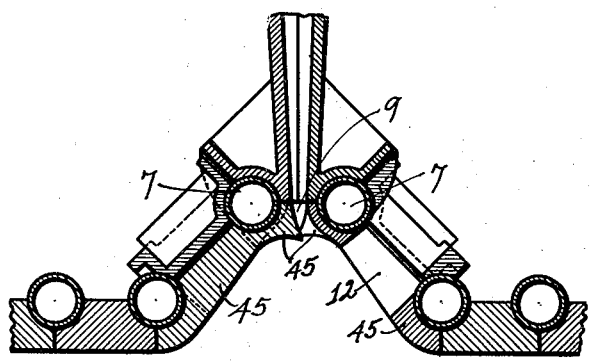
FIG.5.
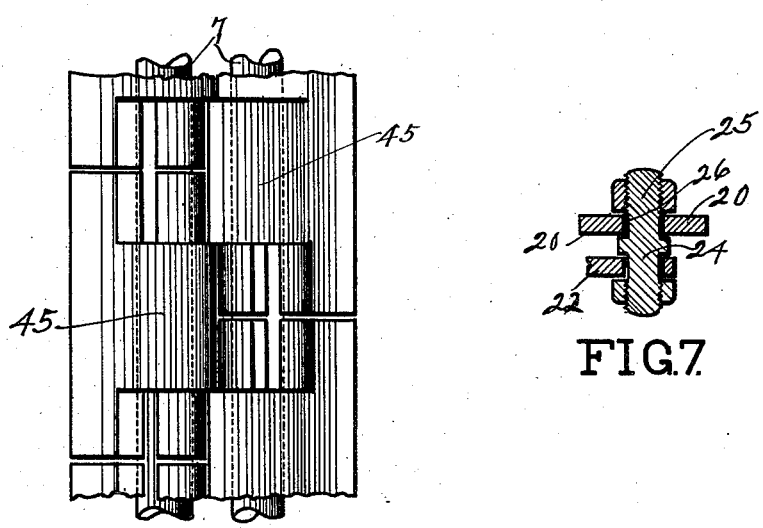
FIG.6.
FIG.7.
INVENTOR
Ralph M. Hardgrove
BY
Gifford, Scull & Burgess
ATTORNEYS

UNITED STATES PATENT OFFICE 1,994,446

FUEL BURNER

Ralph M. Hardgrove, Westfield, N. J., assignor to Fuller Lehigh Company, Fullerton, Pa., a corporation of Delaware Original application January 14, 1928, Serial No. 246,710. Divided and this application October 7, 1929, Serial No. 397,786. Renewed January 26, 1934

15 Claims. (Cl. 110—28)

Figure 1:
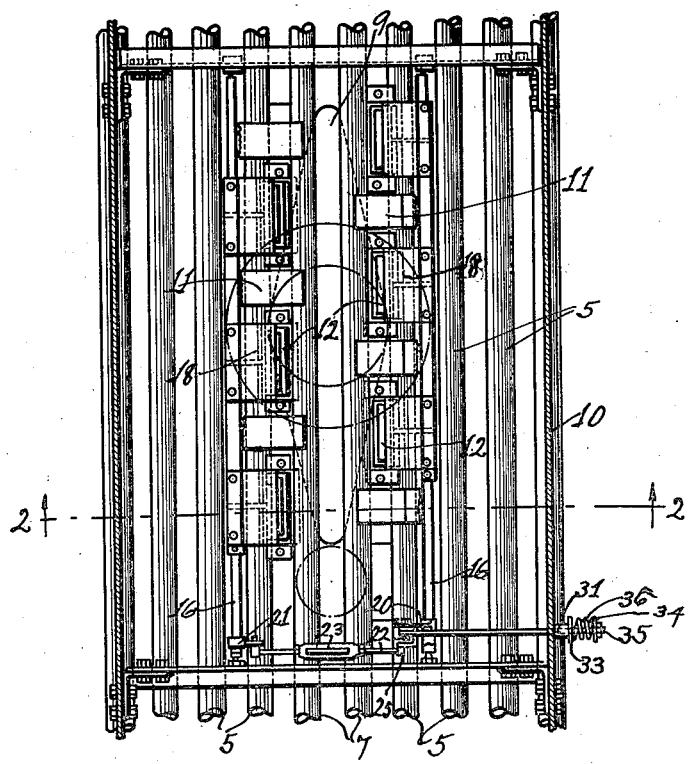
Figure 2:
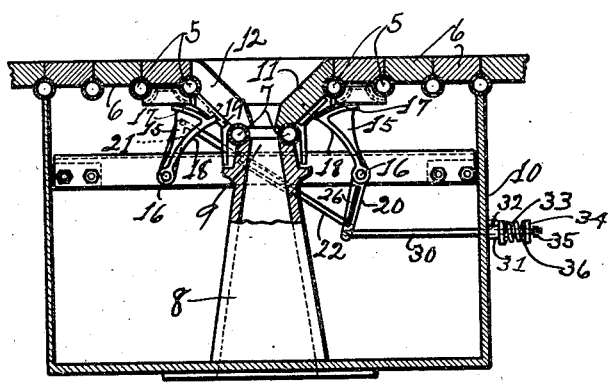
Figure 3:
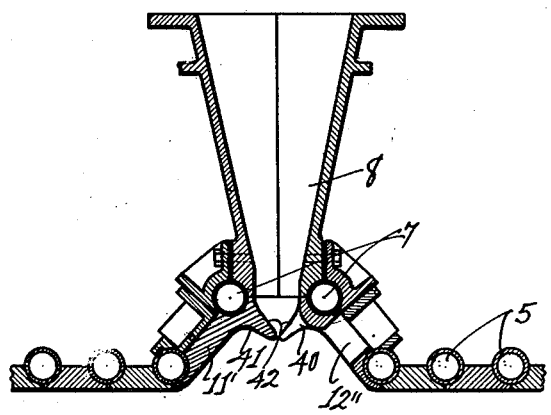
Figure 4:
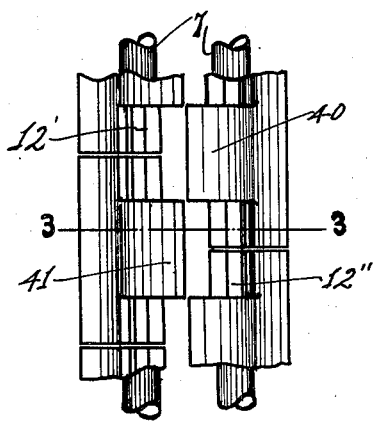

This invention relates to a fuel burner that has an inlet for primary air and fuel and a separate inlet or inlets for secondary air. This is a division of my application Serial No. 246,710, filed January 14, 1928. The invention will be understood from the description in connection with the accompanying drawings, in which Fig. 1 is a front view with parts omitted showing an illustrative embodiment of the invention installed in a furnace wall; Fig. 2 is a section along the line 2—2 of Fig. 1; Fig. 3 is a section along the line 3—3 of Fig. 4 including adjacent tubes; Fig. 4 is a front view partly broken away showing a modification; Fig. 5 is a section similar to Fig. 2 through another modification; Fig. 6 is a front view of Fig. 5; and Fig. 7 is a section on an enlarged scale showing a detail.

The invention will be described in connection with a boiler furnace, in the walls of which water tubes are installed for keeping the walls cool, but the invention is not restricted to this particular sort of furnace. In the drawings, reference character 5 indicates the water tubes to which blocks 6 are connected to form the wall of a furnace, these blocks being preferably made up of refractory material on the side next to the furnace and metal on the other side which contacts with the water tubes. Two of the tubes are bent outwardly, as indicated at 7, to facilitate installation of the fuel burner. A conduit 8 for primary air and fuel, such as pulverized coal, gas, etc., having an elongated exit opening 9 is attached to the tubes 7. A casing 10 into which secondary air for combustion purposes may be introduced in any convenient way, surrounds the conduit 8 and is connected to the furnace wall so as to be air tight. Blocks 11 on opposite sides of the two tubes 7 are spaced apart in staggered relation, so as to leave staggered openings 12 on opposite sides of the pair of tubes 7 through which openings secondary air is admitted from the casing 10. The secondary air entering through the openings 12 impinges against the sides of the stream of fuel entering through the exit opening 9 and causes thorough commingling of the fuel and air.

A fuel burner of the type above described has been known heretofore. With such burners it has been found that when they are operating at decreased loads with smaller amounts of secondary air entering through the ports or openings 12, the velocity of the air is sometimes decreased so much that satisfactory commingling of the fuel and air near the mouth of the burner is not obtained. By the present invention, the velocity of the secondary air is maintained sufficiently high even when decreased amounts of secondary air are being supplied.

In carrying out the invention, means are provided by which the size of the ports or openings 12 for the secondary air may be decreased when the rate of supply of secondary air is decreased, thus keeping the velocity of the air sufficiently great to cause the air to commingle with the fuel as the air impinges against the fuel stream. In the illustrative embodiment of the invention, shown in Figs. 1 and 2, two sets of vertically spaced dampers 15 at opposite sides of the fuel exit openings are mounted on vertical pivot rods 16 and are movable across corresponding air ports or openings 12 in accordance with the amount of air that is to be delivered. Each damper 15 has an arcuate inner side 17 that is moved on turning of the corresponding pivot rod 16 to vary the effective area of a corresponding port 12. Each damper also has a vertical concavely curved side 18 which extends beyond the arcuate shaped side 17, as shown at 19, into the corresponding port 12.

The pair of pivot rods 16 are spaced apart within the casing 10 and have oppositely extending arms 20 and 21 respectively connected to the lower portions thereof. A connecting rod 22 provided with a turnbuckle 23 for adjusting the length thereof connects the inner free end of the arm 21 to a pivot pin 24, as shown in Fig. 7, having a threaded extension 25, that is adjustable in a slot 26 formed in the arm 20.

A rod 30 is pivoted to the outer end of the arm 20 and passes through the side wall of the casing 10 and through an external stop member 31 adapted to be fixed thereon by a set screw 32. A washer 33 bears against the stop 31 and a washer 34 bears against a nut 35 on the outer threaded end of the rod 30. A compression spring 36 is interposed between the washers 33 and 34 which tends to move the rod 30 when loose toward the right, as shown in Fig. 2, to thereby move the dampers towards their closed positions. The set screw 32 is loosened whenever the air pressure in the casing 10 is used to control the extent of opening of the dampers 15.

The operation is as follows: Primary air and fuel are introduced through the conduit 8 and pass out of the exit opening 9 in a wide stream or band. The secondary air is forced into the casing 10 by any convenient means, and passes through the ports or openings 12 and impinges in vertically staggered streams against the opposite sides of the stream of fuel and primary air. When the burner is being operated at high ratings, the pressure of the large volume of secondary air that is required is sufficient to force the dampers 15 into their open positions by its passage along the concave surfaces 18, and since the volume of the air is large, the velocity of the same passing through the ports or openings 12 will be sufficient to cause thorough commingling of the air and fuel. The unbalanced pressure on the sides of the projecting damper portions 19 opposite the air streams aids in opening the dampers and compressing the spring 36 in accordance with the amount of secondary air that is being supplied. When the amount of secondary air is decreased for smaller ratings, the expansion of the spring 36 causes the dampers 15 to be moved toward their closed positions, thus decreasing the size of the ports 12 with decreased amounts of secondary air, so that the velocity of the smaller amount of air entering through the smaller air openings will be sufficient to cause the secondary air and fuel to be properly commingled.

The provision of the slot 26 in the arm 20, by means of which the outer end of the rod 22 that is connected to the arm 21 can be adjusted to different positions, makes it possible to vary the extent to which the two sets of dampers can be closed with respect to each other from uniformity of extent of opening and closure of the two to an extent to which the dampers on the left hand side would be opened and closed only a small fraction of the extent of the dampers on the right hand side.

It will be clear that the spring 36 will cause the dampers to be closed automatically in accordance with the reduction in the secondary air supply. The velocity of the air will thus be kept approximately constant regardless of the quantity of air passing through each air inlet. However, by means of the set screw 32 and adjustment of the bracket 25 in the slot 26, the dampers can be set in any desired fixed position for conditions of operation where the rate is constant or nearly so, at a predetermined load.

In the illustrations shown in Figs. 3 and 4 the fuel and primary air stream entering through the conduit 8 is caused to divide into a plurality of stagged streams that diverge on opposite sides so that the secondary air entering through the secondary air openings will strike these streams substantially at right angles thus causing better commingling of the fuel and air. In these illustrations the blocks 11' are shaped to leave staggered openings 12' and 12" on opposite sides of the primary air and fuel inlet.

The blocks 11' have extensions 40 and 41, Figs. 3 and 4, staggered with respect to each other and corresponding to the openings 12' and 12", respectively, located along the sides of the elongated exit opening of the conduit 8. The extensions 40 and 41 have sloping faces 42 so that the primary air and fuel passing through the exit opening will be thrown in staggered streams in front of corresponding openings 12' and 12".

By this arrangement the entering fuel stream is divided into a vertical series of alternately oppositely diverging streams, each of which is impinged upon by a corresponding air stream at substantially right angles thereto.

In the modification shown in Figs. 5 and 6 staggered blocks 45 are attached to the tubes 7 on opposite sides of the elongated fuel nozzle exit opening 9 for the same purpose as the extensions 40 and 41 in Figs. 3 and 4.

I claim:—

1. In a furnace, a fuel burner having an inlet for primary air and fuel shaped to provide a flat stream of said air and fuel, staggered secondary air inlets on opposite sides of said primary air and fuel inlet, and means to cause said primary air and fuel to enter the furnace substantially at right angles to the direction of entry of the secondary air.

2. In a furnace, a fuel burner having an inlet for primary air and fuel shaped to provide a flat stream of said air and fuel, staggered secondary air inlets on opposite sides of said primary air and fuel inlet, and means to cause the primary air and fuel to divide into a plurality of streams passing into the furnace on the furnace side of said secondary air inlets.

3. In a furnace, a fuel burner having an inlet for primary air and fuel shaped to provide a flat stream of said air and fuel, staggered secondary air inlets on opposite sides of said primary air and fuel inlet, and extensions on opposite sides of said primary air and fuel inlet opposite said secondary air inlets directing the primary air and fuel towards corresponding secondary air inlets.

4. In a furnace, a fuel burner having an inlet for primary air and fuel shaped to provide a flat stream of said air and fuel, staggered secondary air inlets on opposite sides of said primary air and fuel inlet with directions of entry of the air therethrough at an angle to each other and means to cause said primary air and fuel to enter the furnace substantially at right angles to the direction of entry of the secondary air.

5. In a furnace, a fuel burner having an inlet for primary air and fuel shaped to provide a flat stream of said air and fuel, staggered secondary air inlets on opposite sides of said primary air and fuel inlet, and means with projections having sloping faces to cause said primary air and fuel to enter the furnace substantially at right angles to the direction of entry of the secondary air.

6. In a furnace, a fuel burner having an inlet for primary air and fuel shaped to provide a flat stream of said air and fuel, staggered inlets for secondary air on opposite sides of said primary air and fuel inlet, means to cause said primary air and fuel to enter the furnace substantially at right angles to the direction of entry of the secondary air, and means to cause the secondary air to enter the furnace in streams on opposite sides of said burner directed towards each other.

7. In a furnace, a fuel burner having an inlet for primary air and fuel shaped to provide a flat stream of said air and fuel, staggered inlets for secondary air on opposite sides of said primary air and fuel inlet, means to cause said primary air and fuel to enter the furnace substantially at right angles to the direction of entry of the secondary air, and means to cause the secondary air to enter the furnace in streams on opposite sides of said burner at acute angles to the furnace wall.

8. In a furnace, a fuel burner having an inlet for primary air and fuel, staggered secondary air inlets on opposite sides of said primary air and fuel inlet, extensions on opposite sides of said primary air and fuel inlet opposite said respective secondary air inlets, and water cooled tubes to which said extensions are connected.

9. In a furnace, a fuel burner, means to cause primary air and fuel to enter the furnace in a plurality of streams, and means to direct secondary air in streams against said streams of primary air and fuel, said last named means comprising spaced blocks staggered on opposite sides of said burner.

10. In a furnace wall comprising spaced tubes, a fuel burner having a fuel discharge opening between a pair of adjacent wall tubes, an air inlet port adjacent said discharge opening, and means forming a continuation of at least a portion of the discharge end of said fuel burner and in direct thermal contact with one of said pair of adjacent wall tubes for deflecting discharged fuel across the discharge end of said air inlet port.

11. In combination, a furnace wall having a series of spaced cooling fluid tubes, a fuel burner having elongated nozzle means arranged to discharge fuel between adjacent tubes in a plurality of streams arranged in a longitudinal row with alternate streams diverging in direction and each of said streams being undivided transversely and means for supplying air for combustion to the furnace in a plurality of high velocity jets each impinging on and commingling with a corresponding fuel stream.

12. In combination, a furnace wall having a series of spaced cooling fluid tubes, a fuel burner having nozzle means arranged to discharge fuel between adjacent tubes in a plurality of streams alternately oppositely directed, staggered air inlet ports at opposite sides of said fuel burner nozzle means and opening to the furnace between adjacent tubes, and means for supplying air for combustion to the furnace through said air inlet ports in high velocity jets impinging on and commingling with corresponding oppositely directed fuel streams.

13. In combination, a furnace wall having a series of spaced vertically extending cooling fluid tubes at its furnace side, a fuel burner port in said wall, a fuel burner having nozzle means for discharging fuel through said port and between adjacent tubes in a plurality of streams elongated parallel to said tubes and alternately directed in diverging directions, air inlet ports at opposite sides of said fuel burner nozzle means and opening to the furnace between adjacent tubes, and means for supplying air for combustion to the furnace through said air inlet ports in separate high velocity jets each directed towards and impinging on an oppositely directed fuel stream.

14. In combination, a furnace wall having a series of spaced vertically extending cooling fluid tubes at its furnace side, a fuel burner port in said wall, a fuel burner having nozzle means for discharging fuel through said port and between adjacent tubes in a stream elongated transversely of the direction of fuel discharge, a plurality of staggered air inlet ports at opposite sides of said fuel burner nozzle means and between adjacent tubes, means for supplying air for combustion to the furnace through said air inlet ports in separate high velocity jets directed towards said fuel stream, and deflectors at the outlet end of said nozzle means for deflecting adjacent portions of said fuel stream respectively across air inlet ports at opposite sides of said nozzle means.

15. In combination, a furnace wall having a fuel burner opening formed therein, a fuel burner comprising a nozzle adapted to discharge a stream of pulverized fuel and primary air through said wall opening, said nozzle having walls arranged at its discharge end to form an oblong outlet with the bounding edges of opposite walls thereof substantially parallel, a plurality of deflector members positioned along at least one of said opposing edges at points spaced along the length thereof and arranged to extend into the path of the discharge of said nozzle to form a discharge stream with alternate diverging portions, and secondary air discharge means in said furnace wall at opposite sides of said nozzle constructed and arranged to direct streams of secondary air towards and impinging on corresponding portions of said discharge stream.

RALPH M. HARDGROVE.